C. BURGESS, Jr.
SPRING CONSTRUCTION.
APPLICATION FILED JULY 5, 1907.
902,937.
Patented Nov. 3, 1908.
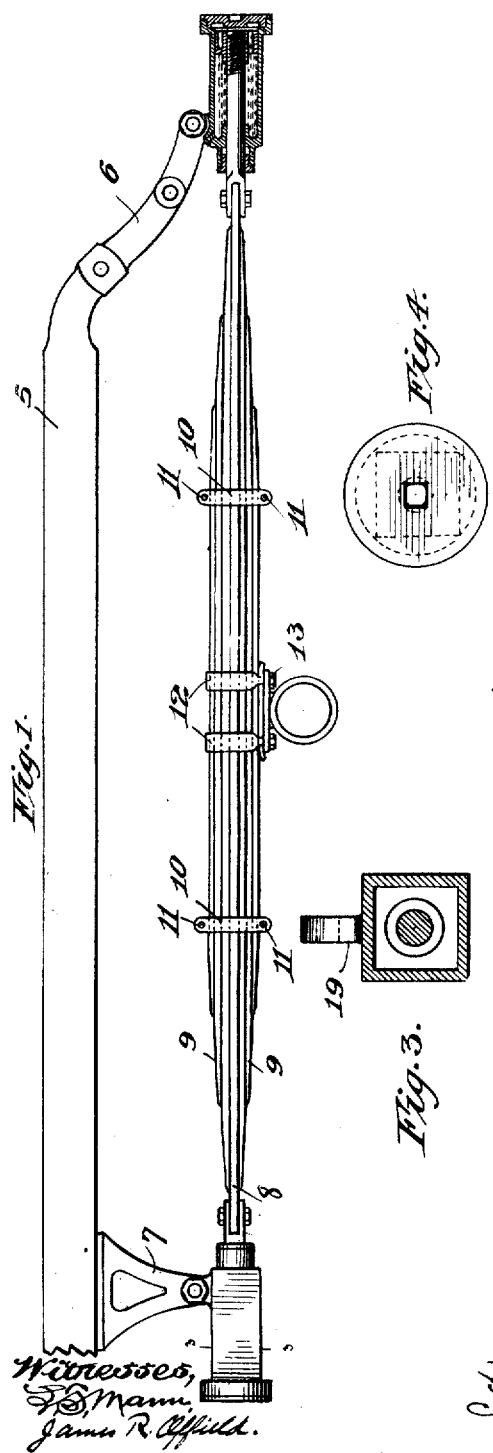
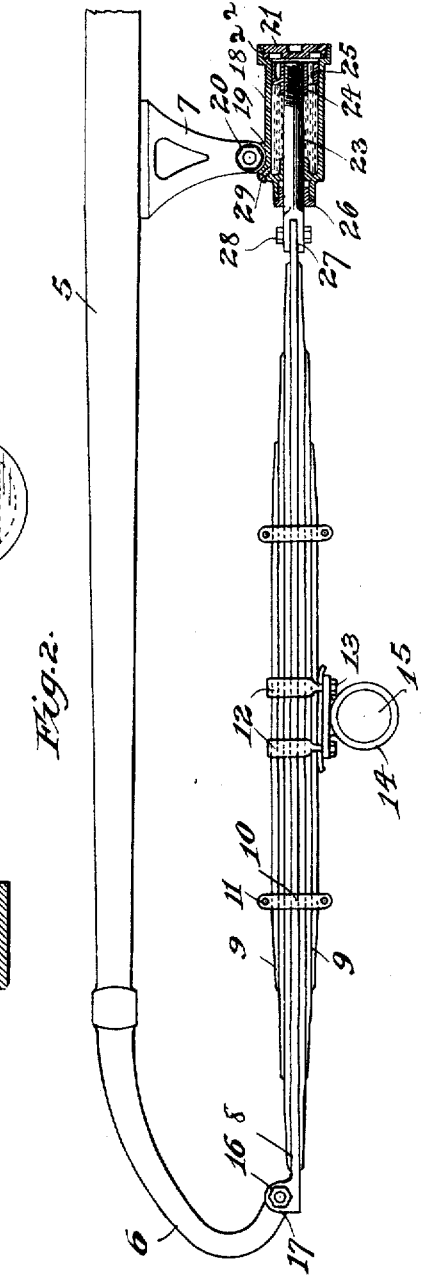
Inventor:
Charles Burgess Jr.
By Offield, Towle & Linthicum
Attys.
Witnesses,
F. S. Mann.
James R. Offield.

UNITED STATES PATENT OFFICE.

CHARLES BURGESS, JR., OF WENONA, ILLINOIS.

SPRING CONSTRUCTION.

No. 902,927.

Specification of Letters Patent.

Patented Nov. 3, 1908.

Application filed July 5, 1907. Serial No. 382,252.

*To all whom it may concern:*

Be it known that I, CHARLES BURGESS, Jr., a citizen of the United States, residing at Wenona, in the county of Marshall and State of Illinois, have invented certain new and useful Improvements in Spring Constructions, of which the following is a specification.

My invention relates to a spring construction, the primary object of which is to absorb the shocks delivered to the frame of a vehicle, to which the spring is attached, when the spring is flexed up or down, and the invention consists in providing a compression member at one or both ends of a spring adapted to contain oil or air that will permit longitudinal movement of the end of the spring whereby the shock will be absorbed in the compression member and not delivered to the frame of the vehicle.

Other objects of the invention are in the provision of a strong and durable spring construction, whereby wear upon the spring is greatly reduced and consequently wear upon the vehicle itself.

In the accompanying drawing, Figure 1 is a longitudinal elevation of the spring construction preferably employed at the rear of a vehicle, for the back wheels; Fig. 2 is a similar view of the forward portion of the vehicle, the frame in both views being broken away and a compression member in section; Fig. 3 is a cross section on line 3—3 of Fig. 1; and Fig. 4 is an end elevation of one of the compression members in Fig. 1.

Referring now more specifically to the drawing, 5 represents the frame of the vehicle, having a hanger arm 6 preferably formed integral with the frame and suitably bent to afford support for one end of a spring, while 7 is a depending arm secured to the frame in any suitable manner and adapted to support the other end of a main spring 8. The main or central spring 8 may have a series of leaves 9 interposed on either side thereof and held in alinement by means of the vertical guide posts 10 and roller bearings 11 interposed on the top and bottom leaves and journaled in the guide posts 10. Secured centrally of the spring, by means of the U-shaped plates 12, is a plate 13 which is provided with an annular bearing 14 for an axle 15.

Referring now to Fig. 2, which is the forward end of a vehicle frame, the central spring 8 is provided with an apertured lug 16 at one end thereof, the aperture in which registers with an eye in the hanger arm 6 of the frame, and is adapted to be pivotally secured thereto by means of the bolt 17. Secured to the depending hanger 7 is a compression member, herein shown consisting of a square casing 18, having an apertured lug 19 formed integral therewith, and the aperture in which registers with an eye in the hanger frame 7, whereby the casing 18 is pivotally secured to the hanger frame by means of the bolt 20. Casing 18 is provided at its rear end with a head 21 that is screwed into an annular flange 22 on the casing, and firmly closes the rearward end thereof.

Slidably mounted within the casing 18 is a piston rod 23 carrying a piston head 24 that is provided with a small aperture 25 whereby oil within the casing is permitted to flow on either side of the piston head. A packing ring 26 prevents leakage at the joint where the piston rod is slidably mounted in the casing. To the outer end of the piston rod 23 one end of the spring 8 is attached, herein shown as seated within a slot 27 in the piston rod and a vertical bolt 28 extends through the two arms formed by the slot in the piston rod as well as through the spring 8, thereby securing said piston rod and spring firmly together. The casing is adapted to be filled with oil or air, whereby when the spring is flexed up or down, the piston head will be drawn forward, thereby compressing the oil or air within the casing and forcing it through the small aperture 25 in the piston head on the opposite sides thereof. As a means for filling the casing, a suitable valve 29 is provided.

Fig. 2 shows the construction as used at the forward end of a vehicle, and the same construction might be used for the rear wheels, but in Fig. 1, I have shown the preferred form used at the rear, which consists of two compression members, one being used at each end of a spring. A straight spring is preferably employed, and the pistons in the compression members are secured in substantial axial alinement with the center spring 8, but this precise construction is not absolutely essential, as the compression members might be disposed at an angle relative to the central leaf of the spring, it being, however, essential that the compression members are pivotally secured to the depending hangers as well as to the frame, and that their angle be sufficient so as to allow the pistons therein to be drawn forward when the spring is flexed up or down. It can be readily seen that this construction accomplishes two points essential to a good spring construction, namely, the permitting of a longitudinal movement of the ends of a spring, as well as preventing the shock imparted to the spring from being directly transmitted to the frame itself. The peculiar construction of the compression member herein shown may be modified, as well as the construction and arrangement of the spring itself relative to the compression members, and therefore without confining myself to the specific construction shown,

I claim:

1. In a spring construction the combination of an axle, a frame, a spring secured between its ends to said axle, one end of said spring secured to said frame, and a compression member comprising a casing having a square bore, pivoted to said frame and adapted to contain a liquid, and a piston provided with a square head within said casing having one of its ends secured to the other end of said spring, substantially as described.

2. In a spring construction the combination of an axle, a frame, a spring secured between its ends to said axle and a compression member at each end of said spring, comprising a casing having a square bore, pivotally secured to said frame and adapted to contain a liquid, a piston having a square head within each of said casings, and said pistons connected to the ends of said spring, substantially as described.

3. In a spring construction the combination of an axle, a frame, a spring secured between its ends to said axle, and a compression member at each end of said spring comprising a casing having a square bore, pivotally secured to said frame and adapted to contain a liquid, a piston having a square head within each of said casings, said pistons connected to said spring at each end thereof and lying in substantially the same horizontal plane as said spring, substantially as described.

4. In a spring construction the combination of an axle, a frame, a spring secured between its ends to said axle, and a compression member at each end of said spring comprising a casing having a square bore, pivotally secured to said frame and adapted to contain a liquid, a piston having a square head within each of said casings, said pistons connected to said spring at each end thereof and in substantial axial alinement with said spring, substantially as described.

CHARLES BURGESS, Jr.

Witnesses:
FREDERICK C. GOODWIN,
JAMES R. OFFIELD.